(12) United States Patent
Numako et al.

(10) Patent No.: US 6,487,370 B2
(45) Date of Patent: Nov. 26, 2002

(54) LENS DRIVE CONTROL APPARATUS

(75) Inventors: Norio Numako, Tochigi (JP); Naoto Nakahara, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/939,564

(22) Filed: Aug. 28, 2001

(65) Prior Publication Data

US 2002/0025151 A1 Feb. 28, 2002

(30) Foreign Application Priority Data

Aug. 31, 2000 (JP) .............................. 2000-264112

(51) Int. Cl.$^7$ ............................................. G03B 17/00
(52) U.S. Cl. .......................................... 396/83; 396/87
(58) Field of Search .................... 396/87, 79, 85, 396/83; 359/696, 697, 698

(56) References Cited

U.S. PATENT DOCUMENTS 6,377,752 B1 * 4/2002 Ishii ............................ 396/87

FOREIGN PATENT DOCUMENTS

JP 2000-199843 7/2000 ............ G02B/7/04

* cited by examiner

*Primary Examiner*—W. B. Perkey
(74) *Attorney, Agent, or Firm*—Greenblum & Bernstein, P.L.C.

(57) ABSTRACT

A lens drive control apparatus includes a movable lens which is movable along the optical axis; a lens driver; a code plate having two limit positions respectively serving as mechanical movement limit positions of the movable lens, the code plate including first and second codes; a code detector which moves together with the movable lens; a pulse generator which generates pulses according to the movement of the movable lens; a pulse counter; and a position determining device which determines an absolute position of the first code detected by the code detector, based on the number of pulses counted by the pulse counter from the time when the code detector detects the first or second code until the time when the code detector detects the subsequent other of the second code or first code.

19 Claims, 9 Drawing Sheets

LENS DRIVE CONTROL APPARATUS

BACKGROUND OF THE INVENTION

1. Field of the Invention

The present invention relates to a lens drive control apparatus that is incorporated in an optical instrument such as a camera, etc.

2. Description of the Related Art

A typical and conventional lens drive control apparatus is provided with a code plate on which a code pattern corresponding to the position of the movable lens is formed, and with a brush synchronized with the motion of a movable lens which reads the code pattern of the code plate. The brush reads the code pattern data and detects the position of movable lens. This type of lens drive control system using the code plate can detect the lens position more accurately if spaces in the code pattern become narrower, thereby the movement control of movable lens can be done more accurately. However, narrowing of the spaces in the code pattern requires the increase of number of codes.

An increase in the number of codes not only requires a larger size of code plate, but also a wider space for providing such a larger sized code plate as well as an increased number of signal cables connected thereto. A wider space for the code plate would result in undesirably large apparatus, therefore the number of codes need to be minimized. A decreased number of codes can be accomplished by, e.g., using relative codes having repeated patterns, however, the relative codes would sometimes be read inaccurately. Furthermore, a normal type of movable lens is provided with a stopper at which further movement of the movable lens is mechanically prohibited, and if the movable lens erroneously reads the code and collides against this stopper, an operator would sense an unpleasant jolt or noise, and can sometimes result in the camera being damaged.

SUMMARY OF THE INVENTION

It is an object of the present invention to provide a lens drive control apparatus in which accurate drive control of movable lens can be performed via a simple structure.

To achieve the object mentioned above, a lens drive control apparatus is provided, including a movable lens which is movable along the optical axis; a lens driver which moves the movable lens; a code plate having two limit positions respectively serving as mechanical movement limit positions of the movable lens, the code plate including first codes corresponding to each of a plurality of predetermined stop positions at which the movable lens is stopped between the two limit positions, and second codes corresponding to each of predetermined positions respectively provided between the limit positions and the plurality of predetermined stop positions; a code detector which moves together with the movable lens in order to detect the first and second codes; a pulse generator which generates pulses according to the movement of the movable lens; a pulse counter which counts the number of pulses generated by the pulse generator; and a position determining device which determines an absolute position of the first code detected by the code detector, based on the number of pulses counted by the pulse counter from the time when the code detector detects one of the first code and second code until the time when the code detector detects the subsequent other of the second code and first code, while the lens driver moves the movable lens toward one of the two limit positions.

In an embodiment, each of the first codes and second codes includes a plurality of detection zones, each detection zone of the plurality of detection zones having a predetermined length with respect to the direction of movement of the movable lens. The pulse counter counts the number of pulses based on one of a moment when the code detector detects an extremity of a detection zone of the plurality of detection zones, and a moment when the code detecting state of the code detector changes from one of a detecting state to non-detecting state and a non-detecting state to a detecting state.

Preferably, the code detector is provided with a first code detector and a second code detector which independently detect the first codes and second codes, respectively.

In an embodiment, the position determining device determines an absolute position of the first code detected by the code detector, based on the number of pulses generated by the pulse generator, from a moment when the code detector detects the change of detecting state of the second code from a non-detecting state to a detecting state until a moment when the code detector detects the change of detecting state of the first code from a non-detecting state to a detecting state.

In an embodiment, one of the two limit positions is provided at a shortest position at which the movable lens can be positioned at a shortest distance from an image plane formed by an imaging optical system including the movable lens, and another of the two limit positions is provided at a longest position at which the movable lens can be positioned at a longest distance from the image plane.

In an embodiment, the imaging optical system includes a step zoom lens which changes the focal length thereof by moving the movable lens and by stopping the movable lens at each stop position of the plurality of predetermined stop positions.

In an embodiment, each distance between each of the first codes or each distance between each of the second codes are not equal to each other.

In an embodiment, the code plate is provided with the second code -between the first code corresponding to the longest position and the first code corresponding to the stop position closest to the longest position.

In an embodiment, either the length in the direction of movement of the movable lens or the number of pulses generated by the pulse generator, with respect to only a detection zone of the second code provided between the first code corresponding to the longest position and the first code corresponding to the stop position closest to the longest position, is different from that of the other detection zones of the second code.

In an embodiment, either the length in the direction of movement of the movable lens or the number of pulses generated by the pulse generator, with respect to only the detection zone of the second code provided between the first code corresponding to the longest position and the first code corresponding to the stop position closest to the longest position, is respectively one of longer and greater than that of the other detection zones of the second code. While the code detector detects the second codes during movement of the movable lens toward the longest position via the lens driver, the position determining device determines that the movable lens has gone beyond the stop position at the longest position when the number of pulses generated by the pulse generator becomes larger than a predetermined number.

In an embodiment, the movable lens is a zoom lens which changes the focal length by zooming from a maximum wide-angle position and subsequently stops at each of the stop positions, wherein the stop position of the zoom lens which is closest to the shortest position is determined as the maximum wide-angle position. Only the length of the second code positioned between the first code corresponding to the stop position closest to the longest position and the first code corresponding to the stop position closest to the longest position is different from the length of the other second codes, with respect to the direction of movement of the movable lens. While the code detector detects the second codes during movement of the zoom lens toward the longest position via the lens driver, the position determining device determines that the zoom lens has gone beyond a maximum telephoto position when the number of pulses generated by the pulse generator becomes larger than a predetermined number.

In an embodiment, while the lens driver moves the movable lens from the shortest position toward the longest position, the position determining device determines that the movable lens reaches the stop position adjacent to the stop position of the shortest position when the code detector detects the first code subsequent to generation of a predetermined number of pulses by the pulse generator.

In an embodiment, the second code is also provided at the position corresponding to a shortest position of the movable lens closest to a image plane formed by an imaging optical system including the movable lens.

In an embodiment, the movable lens is a step zoom lens which can change the focal length thereof by moving the movable lens to any one of the stop positions and performing a focusing operation in a zone between the stop position and the subsequent stop position in the direction of the longest position. The second code also serves as a reference position for focusing control by the step zoom lens.

In an embodiment, the first codes and the second codes are arranged in parallel, and the code detector detects the first codes and the second codes.

In an embodiment, the first codes and second codes have repeated patterns of a binary code of ON and OFF.

Preferably, the first code is used for detecting the focal length of the step zoom lens, and the second code is used for detecting the position of the focusing position of the step zoom lens.

In an embodiment, the pulse counter is reset when the second code is detected by the code detector, and wherein the pulse counter counts the pulse according to the movement of the step zoom lens between the each stop position, of the plurality of predetermined stop positions, detected by the first code.

In an embodiment, the code detecting state of the code detector is the same, with respect to the first code and the second code, when the movable lens is positioned at the shortest position.

The present disclosure relates to subject matter contained in Japanese Patent Application No. 2000-264112 (filed on Aug. 31, 2000) which is expressly incorporated herein in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
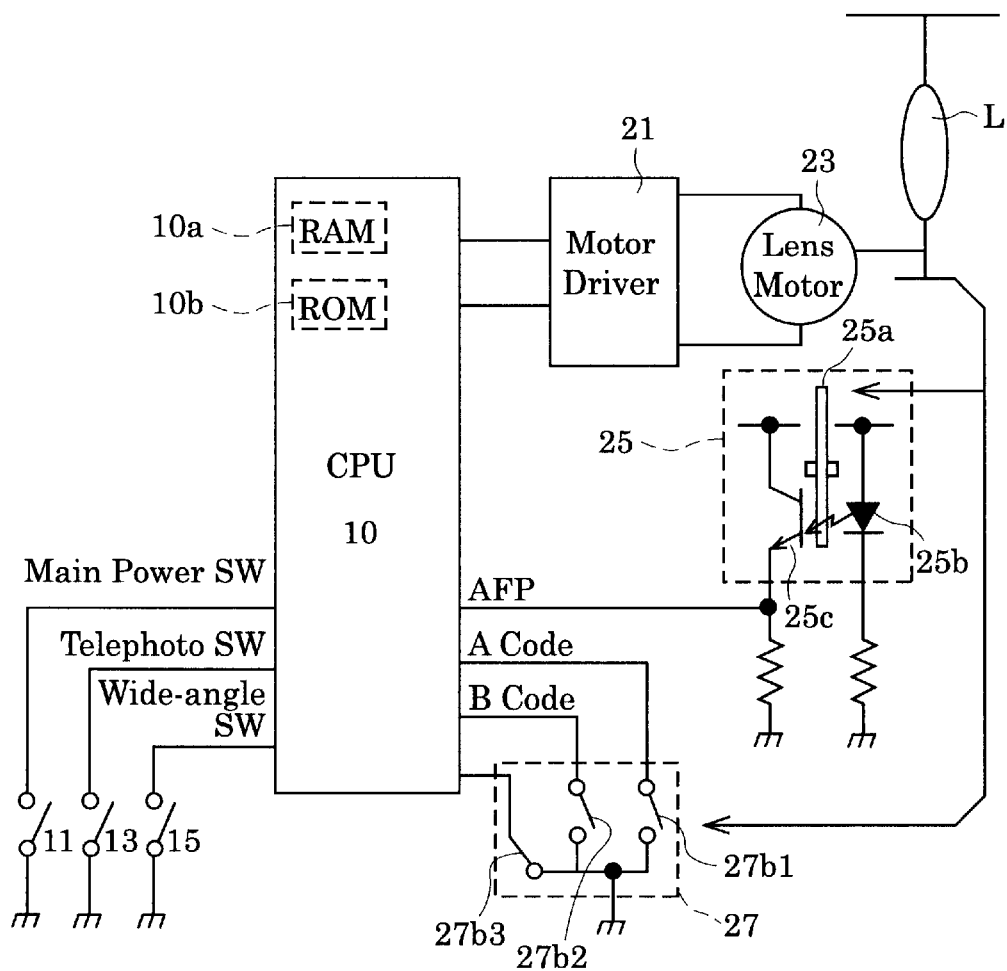
FIG. 1 is a block diagram briefly showing a structure of a control system of a lens drive control apparatus incorporated in a step zoom lens camera according to the present invention.

FIG. 1 is a block diagram briefly showing the structure of a control system applied to a zoom lens camera according to an embodiment of the present invention. The zoom lens camera is a step zoom camera in which a zoom operation and a focus operation of a step zoom lens (imaging optical system) L are performed by rotation of single cam ring.

The overall structure of the step zoom camera to which the illustrated embodiment is applied will be described with reference to FIG. 9. The step zoom lens is constructed as two-lens-group system including a first lens group L1 and a second lens group L2 in that order from the object side. The step zoom lens has a cam ring 51, wherein both multi-step zooming and multi-step focusing can be carried out via rotation of the cam ring 51.

The first lens group L1 is supported by a helicoid ring 53 moving in a linear direction without rotating. The movement of the helicoid ring 53 is associated with the rotation of the cam ring 51, wherein the helicoid ring 53 does not rotate. Thus the first lens group L1 and the helicoid ring 53 integrally move in the linear direction (i.e., the optical axis direction) away from or toward a camera body (not shown). The cam ring 51 is supported by a fixed lens barrel 55 fixed on the camera body. When the cam ring 51 is rotationally driven by a lens motor 23, the cam ring 51 rotates about the optical axis, and at the same time, moves linearly in the optical axis direction.

The second lens group L2 is engaged, via a rectilinear guide ring (not shown) provided inside the cam ring 51, with a cam groove (not shown) formed on an inner peripheral surface of the cam ring 51. When the cam ring 51 rotates, the second lens group L2 moves linearly in the optical axis direction away from or toward the camera body without rotating, while being guided by both the cam groove and the inner guide ring 51.

The step zoom lens moves in the optical axis direction between a retracted position and a fully-extended position via rotation of the cam ring 51. The retracted position is a mechanical movement limit position at which the first lens group L1 cannot move any more toward the image plane (film plane) of the camera body, and the fully-extended position is another mechanical movement limit position at which the first lens group L1 cannot move any further away from the image plane. The movement of the first lens group L1 can be stopped at an arbitrary intermediate position between the retracted position and the fully-extended position.

Furthermore, a mechanism of the stepping zoom lens camera is disclosed for instance in unexamined Japanese Patent publication No. 2000-199843.

The zoom operation of the step zoom lens (movable lens) L is performed as follows. When the cam ring 51 is rotated in any direction, the first and second lens groups L1 and L2 are both moved in the optical axis direction corresponding to the rotational direction of the cam ring 51. A plurality of step positions (zoom positions) are provided between the retracted position and the fully-extended position, so that the first and second lens groups can stop at any of the step positions in order to carry out a step zooming operation (wherein focal length is changed stepwise). The step zoom lens L can be arranged so that the step position nearest to the retracted position is the shortest focal length, and the focal length increases as the first and second lens groups L1 and L2 move toward the fully-extended position. Alternatively, the step zoom lens L can be arranged so that the step position nearest to the retracted position is the longest focal length, and the focal length decreases as the first and second lens groups move toward the fully-extended position. The cam groove of the cam ring 51 has a focusing zones between the each step positions.

The focusing operation of the step zoom lens L is performed as follows. When the first and second lens groups L1 and L2 are stopped at any step position, the cam ring 51 rotates in a direction wherein the first and second lens groups L1 and L2 move toward the fully-extended position, so that the first and second lens groups L1 and L2 can be both moved to a focusing zone provided between a current step position and a subsequent step position. During such a focusing operation, the second lens group L2 independently moves so as to change the relative distance between the first lens group L1 and the second lens group L2 to thereby perform a focusing operation between infinity and the minimum photographing length. The cam groove of the cam ring 51 is provided with a plurality of zooming zones in order to move the first and second lens groups L1 and L2 from the retracted position to each step position, and the cam groove of the cam ring 51 also provided with a plurality of focusing zones in order to perform the focusing operation from each step position.

The lens drive control apparatus according to the illustrated embodiment is applied to a zoom lens camera provided with the step zoom lens L. Upon the position of the second lens group L2 being determined, the position of the first lens group L1 is subsequently determined, or vice versa. Therefore, the illustrated embodiment will be described with reference to the step zoom lens L comprising the first lens group L1 and the second lens group L2, wherein the drive control thereof is carried out by the lens drive control apparatus according to the present invention.

The lens drive system of this zoom lens camera will be hereinafter discussed in detail with reference to FIG. 1. The control system includes a CPU (pulse counter/position determining device) 10 serving as a drive control device of the step zoom lens L, incorporating a ROM 10b in which a control program, etc., has been installed, and also incorporating a RAM 10a for storing parameters for control and calculation purposes. The CPU 10 is connected to a main power switch 11, a telephoto switch 13 and a wide-angle switch 15. Both the telephoto switch 13 and the wide-angle switch 15 are electrically connected to a zooming knob (not shown) for moving the step zoom lens L in the telephoto direction or the wide-angle direction. When the telephoto side of the zooming knob is depressed, the telephoto switch 13 is turned ON, and when the wide-angle side of the zooming knob is depressed, the wide-angle switch 15 is turned ON.

Upon the main power switch 11 being turned ON, the CPU 10 is actuated by receiving power supply from a battery (not shown), and drives the lens motor (lens driver) 23 in the forward direction via a motor driver 21 in order to move the step zoom lens L from the retracted position to the wide-angle extremity. Thereafter, the zooming operation is carried out corresponding to the ON or OFF states of the telephoto switch 13 and the wide-angle switch 15. Upon the main power switch 11 being turned OFF, the CPU 10 drives the lens motor 23 in the reverse direction via the motor driver 21 to move the step zoom lens L back to the retracted position. In the illustrated embodiment, 'wide-angle position' refers to the wide-angle extremity among the predetermined plurality of step positions. Furthermore, in the illustrated embodiment, the 'forward direction' of rotation of the lens motor 23 refers to the direction in which the step zoom lens L is moved toward the telephoto position, and 'reverse direction' thereof refers to the direction in which the step zoom lens L is moved toward the wide-angle direction (toward the retracted position).

Upon the lens motor 23 being rotated, the step zoom lens L moves in the optical axis direction forwardly or rearwardly corresponding to the drive direction of the lens motor 23. While the lens motor 23 is driven, a pulse generator 25 generates pulses (AFP) synchronized with the rotation of the lens motor 23, and the code pattern corresponding to the current position of the step zoom lens L is detected by a zoom encoder (code detector) 27.

The pulse generator 25 includes a slit plate 25a provided on the rotational shaft of the lens motor 23 and rotating integrally with the lens motor 23, and a light emitter element 25b and light receiver element 25c facing each other, the silt plate 25a being provided in between the light emitter element 25b and light receiver element 25c. Thus each pulse signal is output when it is detected that the lens motor 23 rotates by a predetermined amount. The pulse signals output from the pulse generator 25 serve as the pulses for code pattern ("A" code) determination and as AF pulses for the focusing control.

Figure 9:
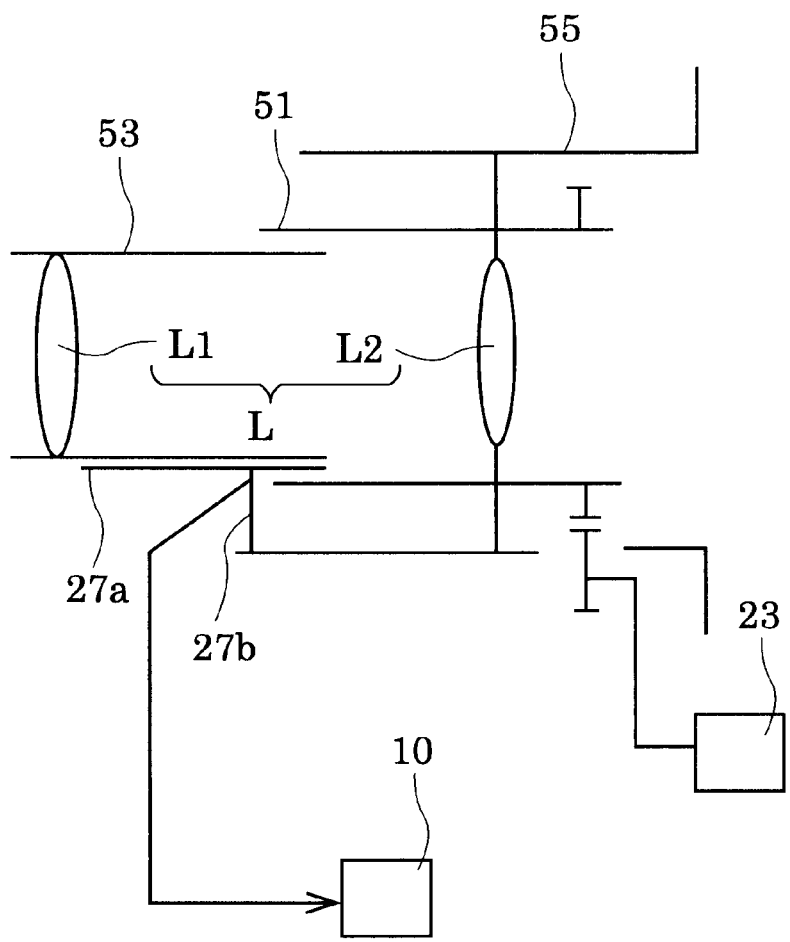
FIG. 9 is an overall skeleton view showing a structure of step zoom lens camera to which the present invention is applied.

As shown in FIG. 9, the zoom encoder 27 is provided with a code plate 27a and a brush 27b. The code plate 27a is fixed on the helicoid ring 53, which supports the step zoom lens L, directly or via a member (not shown) attached to the helicoid ring 53.

Figure 2:
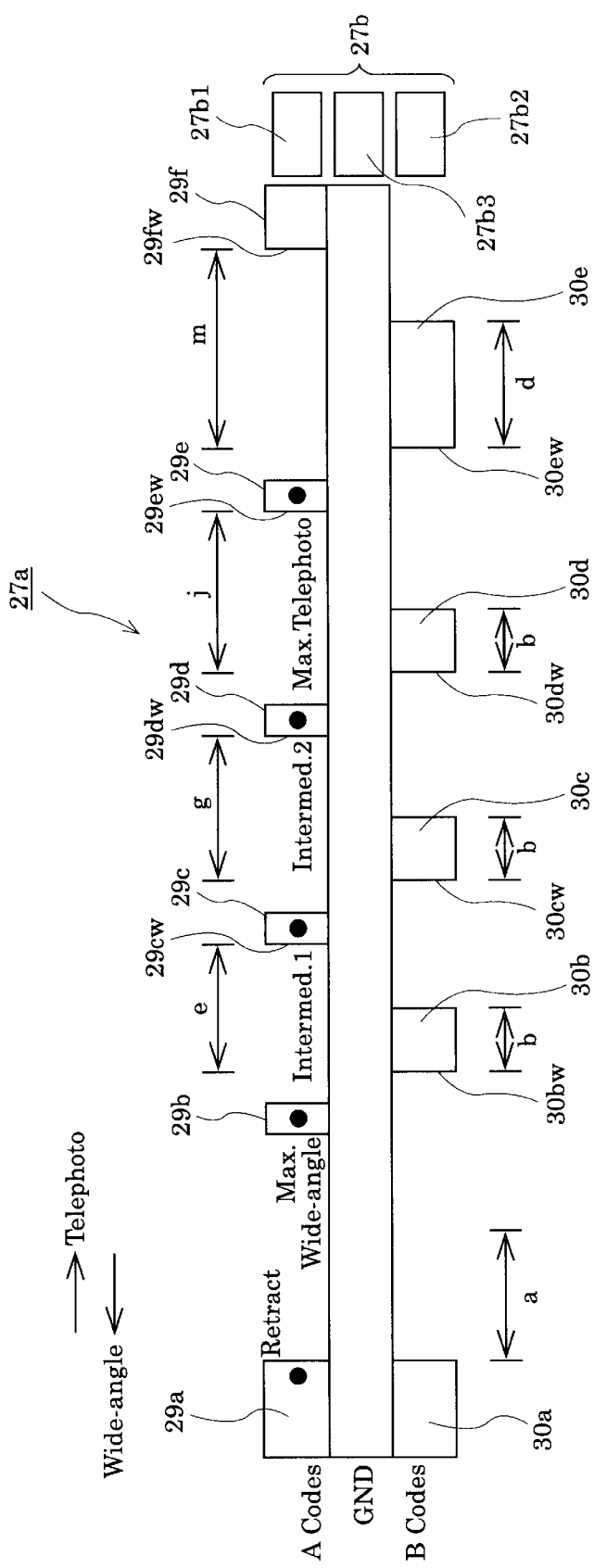
FIG. 2 is a explanatory view of code patterns formed on a code plate of the lens drive control apparatus shown in FIG. 1.

As illustrated in FIG. 2, the code plate 27a has code patterns comprising "A" codes (first codes), "B" codes (second codes) and a ground code for detecting the position of the first lens group L1. The code patterns of the "A" codes and "B" codes are integrally formed with the ground code, thus forming a strip as a whole.

The brush 27b is fixed on the fixed lens barrel 55, which protrudes from the camera, directly or via a member (not shown) attached to the fixed lens barrel 55. Hence the brush 27b becomes in slidable contact with the code plate 27a which moves integrally with the step zoom lens L. The brush 27b has three contact terminals 27b1 (first code detector), 27b2 (second code detector) and 27b3, one of which (the contact terminal 27b3) is in permanent contact with the ground code. When the brush 27b (the contact terminals 27b1 and 27b2) becomes in contact with any code (conductive part) among the code patterns, the signal level of the codes A and B are changed, and the signal level corresponding to the code of the code plate 27a which is in contact with the brush 27b is transmitted to the CPU 10. In the illustrated embodiment, the state in which the brush 27b is in contact with any of the "A" or "B" codes (detection zones) is referred herein as an 'ON' state of the corresponding "A" or "B" codes, and the state in which the brush 27b is not in contact with any of the "A" or "B" codes (detection zones) is referred herein as an 'OFF' state of the corresponding "A" or "B" codes. In addition, the state when the "A" code is ON and the "B" code is OFF is referred herein as 'a first state of the first code and a second state of the second code'. On the other hand, the state when the "B" code is ON and the "A" code is OFF is referred herein as 'the second state of the first code and the first state of the second code'.

The code plate 27a can be provided as a printed substrate, with the code patterns made from conductive material printed on an insulating material.

The "A" code has a plurality of codes of which reference numerals are 29a, 29b, 29c, 29d, 29e and 29f. The "A" code 29a represents a limit position of the step zoom lens L on the wide-angle side at which the step zoom lens L cannot mechanically move any more in the wide-angle direction (i.e., the wide-angle limit position, also representing the retracted position of the step zoom lens L). The "A" code 29f represents another limit position of the step zoom lens L on the telephoto side at which the step zoom lens L cannot mechanically move any more in the telephoto direction (the telephoto limit position, also representing the fully-extended position). The intermediate "A" a codes 29b through 29e respectively represent the predetermined zoom positions. The "A" code 29b represents the maximum wide-angle position, and the "A " code 29e represents the maximum telephoto position. Thus the maximum telephoto position refers to the position at which the step zoom lens L advances in the telephoto direction by the maximum amount among the zoom positions. The "A" code 29c represents a first intermediate position, and the "A" code 29d represents a second intermediate position, each position having been predetermined between the maximum wide-angle position and the maximum telephoto position. The spots appearing in each of "A" codes 29a through 29f of FIG. 2 represent the positions at which the step zoom lens L stops.

The "B" code has a plurality of codes of which reference numerals are 30a, 30b, 30c, 30d and 30e. The "B" code 30a represents the retracted position of the step zoom lens L, and the other "B" codes 30b through 30e are respectively used for focusing control. The "B" code 30b is positioned corresponding to a space between the "A" code 29b and the "A" code 29c. Likewise, the "B" codes 30c, 30d and 30e are respectively positioned between the "A" codes 29c and 29d, 29d and 29e, and 29e and 29f.

The CPU 10 moves the step zoom lens L toward the telephoto side, in order to focus on the object in a photographic operation, from any of the zoom positions which the step zoom lens L is currently stopped at. Pulses output from the pulse generator 25 are counted from the moment when any of the states of the "B" codes 30b through 30e is ON, so that the position control of the step zoom lens L can be carried out based on the counted value of pulses. Thereafter, upon completion of the photographic operation, the CPU 10 moves the step zoom lens L to the previous "A" code position.

Both the "A" code and "B" code are ON only when the step zoom lens L is at the retracted position.

In the illustrated embodiment, the length (width) 'd' of the "B" code 30e in the direction of the optical axis O is longer than the lengths 'b' of the other "B" codes 30b, 30c and 30d which are used for focusing control. The number of pulses output from the pulse generator 25 while the step zoom lens L moves by the amount equal to the length (width) of any of the "B" codes 30b through 30e, is determined in proportion to the length (width) of the "B" codes 30b through 30e. Hence the number of pulses Pd corresponding to the length of the "B" code 30e is larger than the number of pulses Pb corresponding to the length of the other "B" codes for focusing control 30b, 30c and 30d. Accordingly, when the step zoom lens L moves toward the telephoto position, it is possible to determine whether or not the step zoom lens L exceeds the maximum telephoto position by detecting the number of pulses output each time a "B" code is ON.

Furthermore, according to the illustrated embodiment, a length 'e' represents the length between the wide-angle extremity 30bw of the "B" code 30b and the wide-angle extremity 29cw of the "A" code 29c; a length 'g' represents the length between the wide-angle extremity 30cw of the "B" code 30c and the wide-angle extremity 29dw of the "A" code 29d; a length 'j' represents the length between the wide-angle extremity 30dw of the "B" code 30d and the wide-angle extremity 29ew of the "A" code 29e; and the length 'm' represents the length between the wide-angle extremity 30ew of the "B" code 30e and the wide-angle side 29fw of the "A" code 29f. The lengths 'e', 'g', 'j' and 'm' are not equal to each other.

The number of pulses output while the step zoom lens L moves by an amount equal to any of the lengths 'e', 'g', 'j' and 'm' defined between the "B" codes and the "A" codes, is determined in proportion to the length 'e', 'g', 'j' and 'm' between the "B" codes and the "A" codes. Hence, the numbers of pulses Pe, Pg, Pj and Pm corresponding to the lengths 'e', 'g', 'j' and 'm' between the "B" codes and "A" codes are not equal to each other. Thus the CPU 10 can determine the position of the step zoom lens L according to the code pattern detected by the zoom encoder 27 (ON/OFF state of the "A" codes and "B" codes, and the change of such state), and based on the number of pulses output from the pulse generator 25.

Both the "A" codes and the "B" codes represent only two types of values (ON and OFF), and these codes are the relative codes including repeated patterns, therefore it is almost impossible to accurately detect the limit positions (the wide-angle limit position and the telephoto limit position) and the zoom positions (the maximum wide-angle position, the first intermediate position, the second intermediate position and the maximum telephoto position) by simply using the combination of ON/OFF states of two code patterns.

According to the illustrated embodiment, the retracted position (the wide-angle limit position) is detected by using both the "A" code and the "B" code, while the telephoto limit position is detected based on the number of pulses output when the "B" code 30e, provided between the maximum telephoto position and the telephoto limit position, is ON.

The lengths 'e', 'g', 'j' and 'm' between the "B" codes and "A" codes are have the following relationship: $e<g<j<m$.

Accordingly, the numbers of pulses Pe, Pg, Pj and Pm have the following relationship: Pe<Pg<Pj<Pm.

The operation of the lens drive control process performed by the CPU 10 will be hereinafter discussed with reference to flow charts shown in FIGS. 3 through 8.

Figure 3:
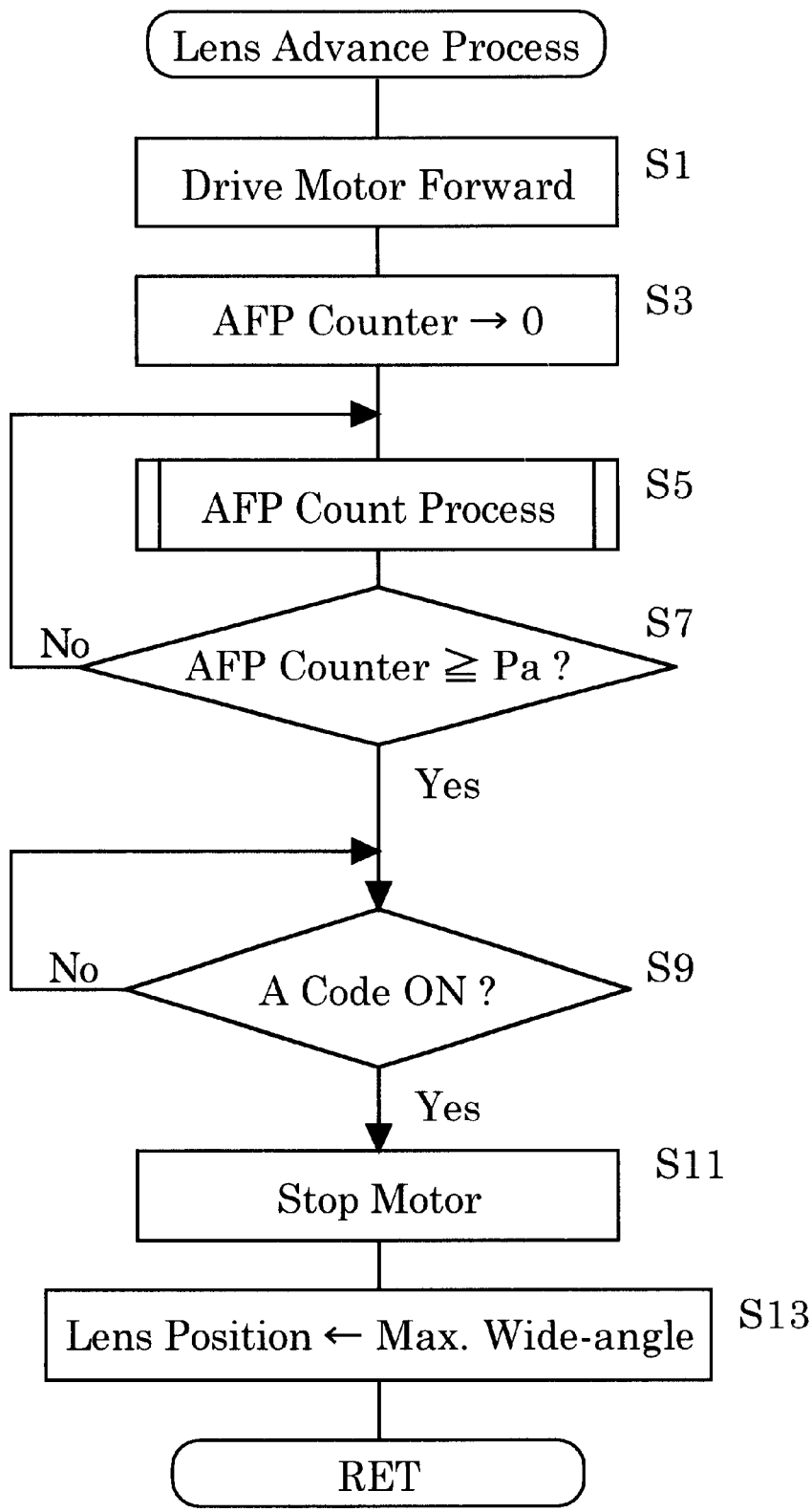
FIG. 3 is a flow chart showing a lens advancing-operation process of the lens drive control apparatus shown in FIG. 1.

FIG. 3 is a flow chart showing the lens advance process of the camera, in which the step zoom lens L advances from the retracted position to the maximum wide-angle position. This process is performed upon the main power switch 11 being turned ON.

In the lens advance process, the lens motor 23 is driven in the forward direction by the motor driver 21 (step S1). Thereafter, the AFP (AF pulse) counter is set to 0 (step S3), and the AFP count process is started (step S5). When the lens motor 23 rotates in the forward direction, the step zoom lens L moves from the retracted position to the maximum wide-angle position, whereby pulses are generated from the pulse generator 25 according to the rotation of the lens motor 23 (i.e. the movement of the step zoom lens L). Therefore, in the AFP count process at step S5, the value of the AFP counter is in incremented by 1 every time the pulse generator 25 outputs a pulse.

Upon completion of the AFP count process at step S5, it is determined whether or not the value of the AFP counter is equal to or larger than the number of pulses Pa (step S7), and if it is detected at step S7 that the value of the AFP counter is smaller than the number of pulses Pa, control is returned to step S5. The reference sign 'Pa' designates the number of pulses generated by the pulse generator 25 while the step zoom lens L moves from the retracted position to the approximate intermediate position (at length 'a' in FIG. 2) between the retracted position and the maximum wide-angle position.

Subsequently, when the value of the AFP counter becomes equal to or larger than the number of pulses Pa, control proceeds to step S9 and waits until it is determined that the "A" code is in an ON state. Upon the "A" code attaining an ON state, control proceeds to step S11 to thereby stop the lens motor 23 via the motor driver 21. Subsequently, the current lens position is stored in the RAM 10a as the maximum wide-angle position (step S13).

In the lens advance process, the CPU 10 determines whether or not the step zoom lens L reaches the maximum wide-angle position according to the ON state of the "A" code. Since the "A" code also is ON at the retracted position, if the maximum wide-angle position is determined solely by the ON state of the "A" code, there is a risk that the step zoom lens L at the retracted position is erroneously determined as being at the maximum wide-angle position. Therefore, in the lens advance process of the illustrated embodiment, control waits at step S7 until it is determined that the pulse generator 25 generates pulses equal to or larger than the number of pulses Pa. Thereafter, it is determined whether or not the "A" code is ON. Consequently, erroneous determination of the wide-angle position is prevented.

Other methods which avoid erroneous determination of the wide-angle position are also possible. For example, it can be determined that the step zoom lens L is at the retracted position when both the "A" code and the "B" code are ON, and it can be determined that the step zoom lens L is at the wide-angle position only when the "A" code is ON. Furthermore, as an alternative method, control can first wait until both the "A" code and the "B" code are OFF, and upon determining that the A and "B" codes are OFF, if the "A" code thereafter only becomes ON, it is determined that the step zoom lens L is at the maximum wide-angle position. In these methods, however, while the step zoom lens L is at the retracted position, if any of the contact terminals of the brush 27b (zoom encoder 27) being in contact with the code pattern 27a looses contact with the code pattern 27a even for an instant, erroneous determination would occur. Therefore, according to the illustrated embodiment, the advance of the step zoom lens L from the retracted position to the approximate intermediate position between the retracted position and the maximum wide-angle position is first detected based on the number of pulses. Thereafter, it is determined whether or not the step zoom lens L reaches the maximum wide-angle position by detecting the "A" code, whereby the advance of the step zoom lens L to the maximum wide-angle position can be carried out without erroneous determination due to the methods discussed above.

Figure 4:
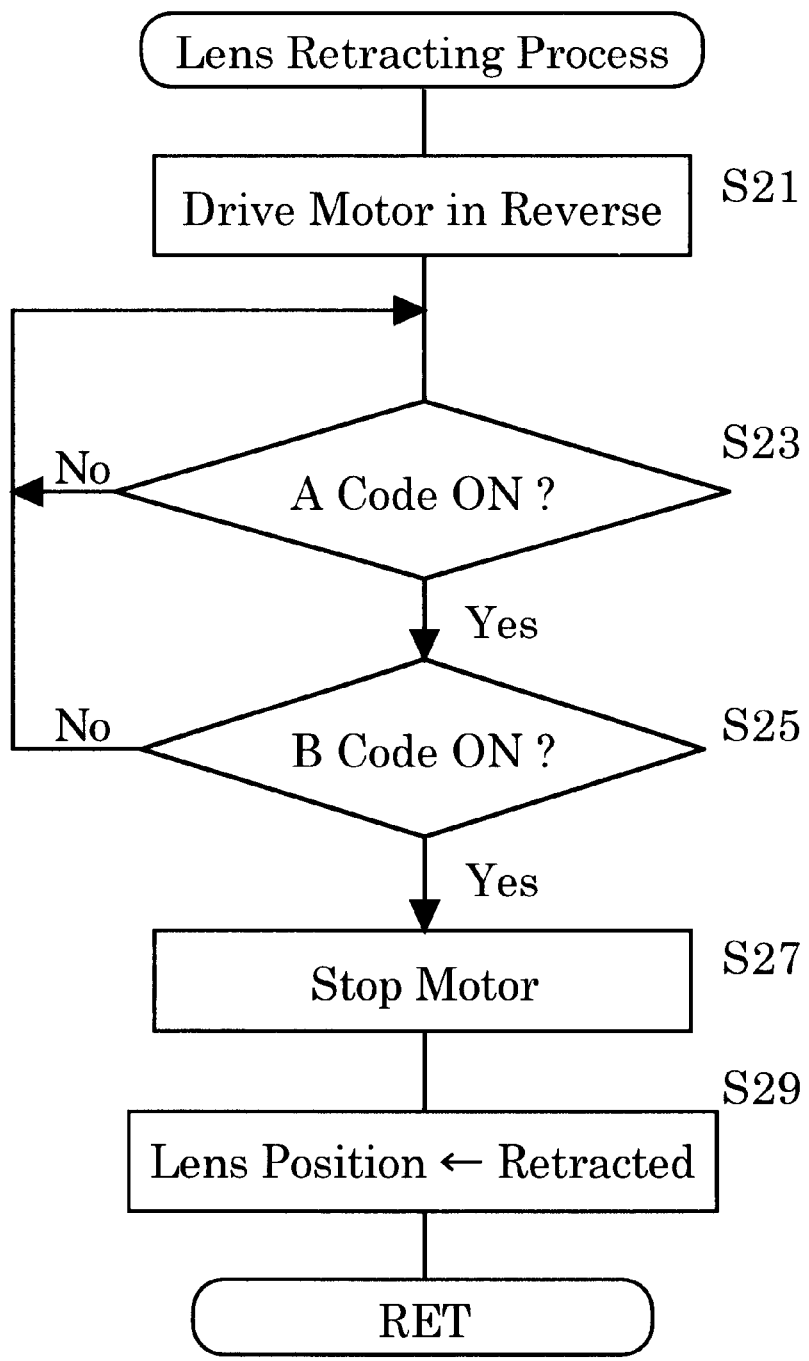
FIG. 4 is a flow chart showing a lens retracting process of the lens drive control apparatus shown in FIG. 1.

FIG. 4 is a flow chart showing the lens retracting process of the camera, in which the step zoom lens L is moved back to the retracted position. This process is performed upon the main power switch 11 being turned OFF.

In the lens retracting process, the lens motor 23 is driven in the reverse direction by the motor driver 21 (step S21). Thereafter, control waits until it is determined that both the "A" code and the "B" code are ON. More specifically, control first waits until it is determined that the "A" code is ON (step S23), and if it is determined at step S23 that the "A" code is ON, control proceeds to step S25 and further waits until it is determined that the "B" code is ON. When the "A" code and the "B" code is ON, control proceeds to step S27 in order to stop the lens motor 23 via the motor driver 21. Subsequently, the current lens position is stored in the RAM 10a as the retracted position (step S29).

Both the "A" code and the "B" code become ON only when the step zoom lens L is at the retracted position, hence the step zoom lens L can be reliably moved back to the retracted position without a non-retracted position of the step zoom lens L being erroneously determined as the retracted position.

Figure 5:
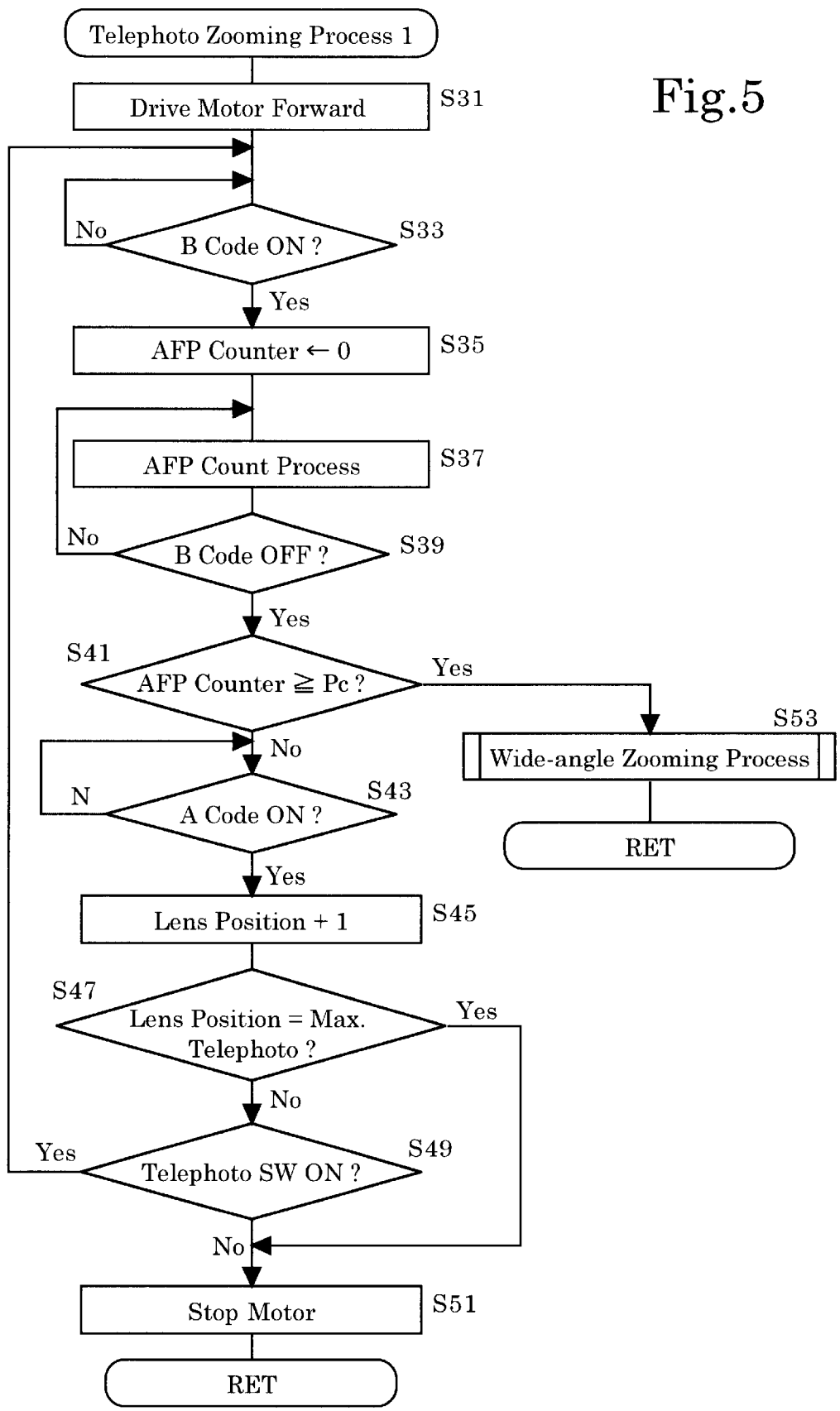
FIG. 5 is a flow chart showing a first embodiment of the lens drive control of the lens drive control apparatus shown in FIG. 1 in a telephoto direction (telephoto zooming process)

The operation of the telephoto zooming process, in which the step zoom lens L moves in the telephoto direction upon the telephoto switch 13 being turned ON, will be hereinafter discussed with reference to flow charts shown in FIGS. 5 through 7. There are three embodiments of this telephoto zooming process, and FIGS. 5 through 7 respectively correspond to these first through third embodiment FIG. 5 is a flow chart showing the first embodiment of the telephoto zooming process. According to this first embodiment, whether or not the step zoom lens L reaches the maximum telephoto position is determined based on the number of pulses output from the pulse generator 25 while the "B" code is ON.

As shown in FIG. 5, the lens motor 23 is driven in the forward direction by the motor driver 21 (step S31), and control waits until the "B" code is ON (step S33). When the lens motor 23 rotates in the forward direction, the step zoom lens L moves in the telephoto direction, whereby pulses are generated from the pulse generator 25 according to the rotation of the lens motor 23 (i.e. the movement of the step zoom lens L). Upon the "B" code becoming ON at step S33, the AFP counter is set to 0 (step S35) and the AFP count process is started (step S37). In the AFP count process at step S37, the value of the AFP counter is incremented by 1 every time the pulse generator 25 outputs a pulse.

During movement of the step zoom lens L toward the maximum telephoto position, every time when the brush 27b becomes in contact with the conductive part of the "B" code at the wide-angle extremity (step S33), the AFP counter is set to 0 (step S35), and subsequently the AFP count process is started (step S37). Therefore, error in pulse counting due to hunting of step zoom lens L during the movement thereof, etc., is minimized, thus the lens position can be detected with excellent accuracy.

Upon completion of AFP count process at step S37, it is determined whether or not the "B" code is OFF (step S39). If it is determined at step S39 that the "B" code is OFF, it is subsequently determined whether or not the value of the AFP counter (i.e. the number of pulses output by the pulse generator 25 while the "B" code is ON) is equal to or larger than the number of pulses Pc (step S41). The number of pulses Pc is a predetermined threshold number larger than the number of pulses Pb output while each of the "B" codes 30b, 30c and 30d is ON, and smaller than the number of pulses Pd output while the "B" code 30e is ON. In other words, the pulse number Pc is larger than the pulse number Pb corresponding to the length of the each "B" codes 30b, 30c and 30d, and smaller than the number Pd corresponding to the length of the "B" code 30d.

When it is determined at step S41 that the value of the AFP counter is smaller than the number of pulses Pc, control waits until "A" code is ON (step S43). When it is determined at step S43 that the "A" code is ON, the lens position number stored in the RAM 10a is incremented by 1 (step S45). In other words, the lens position stored in the RAM 10a is shifted by one step closer to the maximum telephoto position. Thereafter, it is determined whether or not the current lens position is the maximum telephoto position (step S47). If it is determined at step S47 that the current lens position is not the maximum telephoto position, it is subsequently determined whether or not the telephoto switch 13 is turned ON (step S49). If it is determined at step S49 that the telephoto switch has been turned ON, control is returned to step S33, whereby the movement of the step zoom lens L in the telephoto direction is continued. If it is determined at step S47 that the step zoom lens L is currently at the maximum telephoto position, or if it is determined at step S49 that the telephoto switch is not turned ON, the lens motor 23 is stopped via the motor driver 21 (step S51). At that time, the step zoom lens L is stopped at the position where one of the "A" codes 29b through 29e is ON.

If it is determined at step S41 that the value of the AFP counter is equal to or larger than the number of pulses Pc, the step zoom lens L has gone beyond the maximum telephoto position toward the telephoto limit position. Consequently, the wide-angle zooming process (see FIG. 8) is performed in order to move the step zoom lens L back to the maximum telephoto position, whereby the step zoom lens L is stopped when the "A" code 29e is ON. Thereafter, the current lens position stored in the RAM 10a is determined as the maximum telephoto position (step S53).

The above-described telephoto zooming process ends when it is determined at step S47 that the step zoom lens L has reached the maximum telephoto position, or when it is determined at step S49 that the telephoto switch 13 is not turned ON upon the "A" code becoming ON. Therefore, the operation of moving the step zoom lens L back at step S53 will not normally be performed.

However, there may be a case where the lens position stored in the RAM 10a of the CPU 10 does not coincide with the actual lens position due to, for example, erroneous movement of the lens barrel caused by an unintentional external force. Even in this case, according to the first embodiment of the telephoto zooming process, it is determined at step S41 whether or not the step zoom lens L goes beyond the maximum telephoto position based on the number of pulses output while the "B" code is ON. Thus the drive of the step zoom lens L can be controlled so as not to collide with a stopper (not shown) provided at the telephoto limit position.

Figure 6:
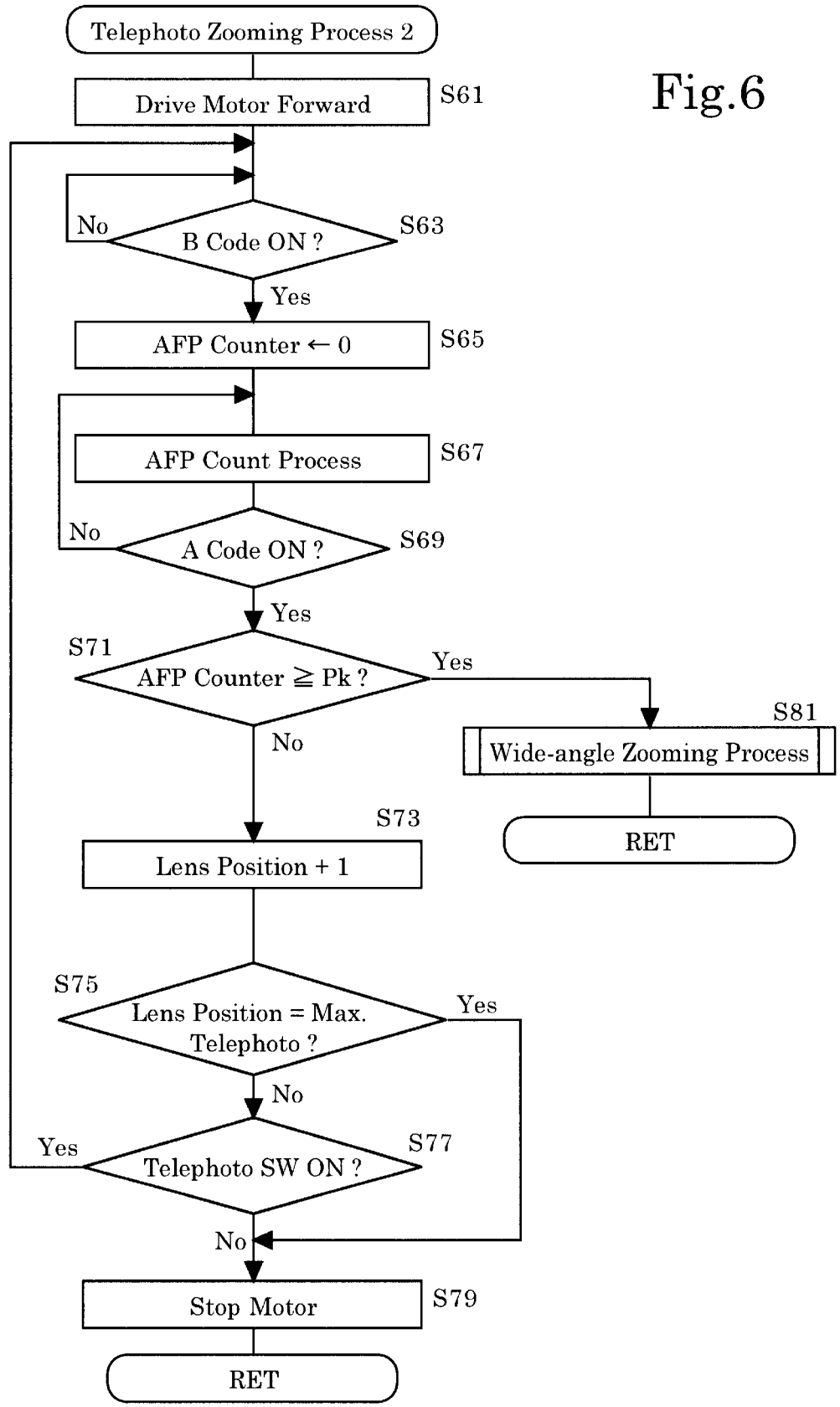
FIG. 6 is a flow chart showing a second embodiment of the lens drive control of the lens drive control apparatus shown in FIG. 1 in a telephoto direction (telephoto zooming process)

FIG. 6 is a flow chart showing the second embodiment of the telephoto zooming process. According to this second embodiment, whether or not the step zoom lens L goes beyond the maximum telephoto position is determined based on the number of pulses output from the pulse generator 25 from the time when the "B" code becomes ON until the time when the "A" code becomes ON, while zoom lens L moves to the telephoto position.

As shown in FIG. 6, the lens motor 23 is driven in the forward direction by the motor driver 21 (step S61), and control waits until the "B" code is ON (step S63). When the "B" code is ON at step S63, the AFP counter is set to 0 (step S65) and the AFP count process is started (step S67). In the AFP count process at step S67, the value of the AFP counter is incremented by 1 every time the pulse generator 25 outputs a pulse.

As above discussed in the first embodiment, since the AFP count process is performed after setting the AFP counter to 0, error in pulse counting due to hunting of step zoom lens L during the movement thereof, etc., is minimized, thus the lens position can be detected with excellent accuracy.

Upon completion of the AFP count process at step S67, it is determined whether or not the "A" code is ON (step S69). If it is determined at step S69 that the "A" code is not ON, control returns to step S67 and waits until the "A" code is ON. If it is determined at step S69 that the "A" code is ON, it is subsequently determined whether or not the value of the AFP counter (i.e. the number of pulses output by the pulse generator 25 between the time when the "B" code becomes ON at step S63 and the time when the "A" code becomes ON at step 69) is equal to or larger than the number of pulses Pk (step S71). The number of pulses Pk is a threshold number obtained by a formula 'Pk =(Pj+Pm)/2'. The reference sign Pj designates the number of pulses output between the time at which the "B" code 30d becomes ON and the time at which the "A" code 29e becomes ON. Likewise, the reference sign Pm designates the number of pulses output from the time when the "B" code 30e becomes ON until the time when the "A" code 29f becomes ON.

When it is determined at step S71 that the value of the AFP counter is smaller than the number of pulses Pk, the lens position number stored in the RAM 10a is incremented by 1 (step S73). In other words, the lens position stored in the RAM 10a is shifted one step closer to the maximum telephoto position. Thereafter, it is determined whether or not the current position is the maximum telephoto position (step S75). If it is determined at step S75 that the current lens position is not the maximum telephoto position, it is subsequently determined whether or not the telephoto switch 13 is turned ON (step S77). If it is determined at step S77 that the telephoto switch has been turned ON, control is returned to step S63, whereby the movement of the step zoom lens L in the telephoto direction is continued. If it is determined at step S75 that the step zoom lens L is currently at the maximum telephoto position, or if it is determined at step S77 that the telephoto switch is not turned ON when the "A" code is ON, the lens motor 23 is stopped via the motor driver 21 (step S79). At that time, the step zoom lens L is stopped at the position where one of the "A" codes 29b through 29e is ON.

If it is determined at step S71 that the value of the AFP counter is equal to or larger than the number of pulses Pk, the step zoom lens L has gone beyond the maximum telephoto position toward the telephoto limit position. Consequently, the wide-angle zooming process (see FIG. 8) is performed in order to draw the step zoom lens L back to the maximum telephoto position, whereby the step zoom lens L is stopped when the "A" code 29e becomes ON. Thereafter, the current lens position stored in the RAM 10a is determined as the maximum telephoto position (step S81).

Consequently, even when the lens position based on the "A" code has been erroneously determined, it is still possible to determine the accurate lens position based on the number of pulses output after the "B" code becoming ON. Thus the drive of the step zoom lens L can be controlled not to collide with a stopper (not shown) provided at the telephoto limit position.

Figure 7:
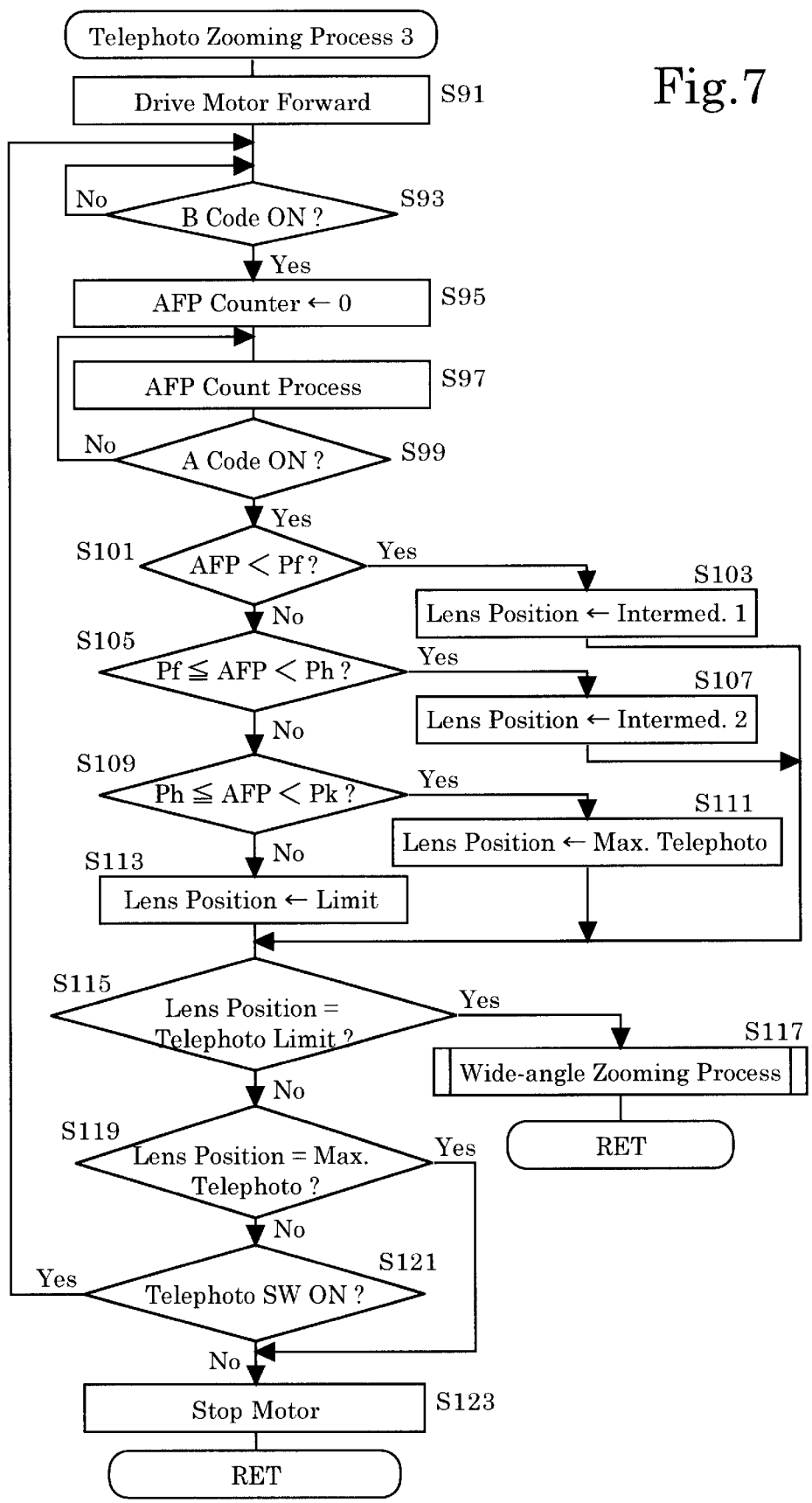
FIG. 7 is a flow chart showing a third embodiment of the lens drive control of the lens drive control apparatus shown in FIG. 1 in a telephoto direction (telephoto zooming process)

FIG. 7 is a flow chart showing the third embodiment of the telephoto zooming process. According to this third embodiment, every lens position not limited to the maximum telephoto position is determined based on the number of pulses output from the pulse generator 25 in every corresponding zone between the "B" code and the "A" code (between the time at which the "B" code becomes ON and the time at which the "A" code becomes ON).

According to the third embodiment of the telephoto zooming process, numbers of pulses Pf, Ph and Pk are provided, respectively serving as the threshold number for determining the lens position. The number of pulses Pf is obtained by the formula: Pf=(Pe+Pg)/2. Likewise, the number of pulses Ph is obtained by the formula: Ph=(Pg+Pj)/2, and the number of pulses Pk is obtained by the formula: Pk=(Pj+Pm)/2. The reference designators Pe, Pg, Pj and Pm respectively designate the numbers of pulses output in the zones between the "B" codes and the "A" codes corresponding to the length 'e', 'g', 'j' and 'm' as shown in FIG. 2. Therefore, the numbers of pulses Pf, Ph and Pk serving as the threshold, and the numbers of pulses Pe, Pg, Pj and Pm output at the respective zones between the "B" code and "A" code, are under the relation of 'Pe<Pf<Pg <Ph<Pj<Pk<Pm'.

As shown in FIG. 7, the lens motor 23 is driven in the forward direction by the motor driver 21 (step S91), and control waits until the "B" code becomes ON (step S93). Upon the "B" code becoming ON at step S93, the AFP counter is set to 0 (step S95) and the AFP count process is started (step S97).

As discussed above in the first and second embodiments, since the AFP count process is performed after setting the AFP counter to 0, every time the "B" code becomes ON, error in pulse counting due to hunting of step zoom lens L during the movement thereof, etc., is minimized, thus the lens position can be detected with excellent accuracy.

Upon completion of AFP count process at step S97, it is determined whether or not the "A" code is ON (step S99). If it is determined at step S99 that the "A" code is not ON, control returns to step S97 and waits until the "A" code becomes ON. If it is determined at step S99 that the "A" code is ON, the current position of the step zoom lens L is determined based on the value of the AFP counter (i.e. the number of pulses output by the pulse generator 25 between the time when the "B" code becomes ON at step S93 and the time when the "A" code becomes ON at step 99), and the current lens position data is stored in the RAM 10a (step S101 through step S115). AS shown in FIG. 2, since the length between the "B" code and "A" code is not equal to each other, the CPU 10 can determine the current position of the step zoom lens L according to the value of the AFP counter.

When it is determined at step S101 that the value of the AFP counter is smaller than the number of pulses Pf (Pe<Pf<Pg), it is determined that the step zoom lens L is currently at the first intermediate position (step S103). If it is determined at step S101 that the value of the AFP counter is equal to or larger than the number of pulses Pf, and if it is subsequently determined at step S105 that the value of the AFP counter is smaller than the number of pulses Ph (Pg<Ph<Pj), it is determined that the step zoom lens L is currently at the second intermediate position (step S107). Likewise, if it is determined at step S105 that the value of the AFP counter is equal to or larger than the number of pulses Ph, and if it is subsequently determined at step S109 that the value of the AFP counter is smaller than the number of pulses Pk (Pj<Pk<Pm), it is determined that the step zoom lens L is currently at the maximum telephoto position (step S111). Eventually, if it is determined at step S109 that the value of the AFP counter is equal to or larger than the number of pulses Pk, it is determined that the step zoom lens L is currently at the telephoto limit position (step S113).

Upon the current lens position being determined under the process from step S101 to step S113, it is determined whether or not the current lens position is the telephoto limit position (step S115). If it is determined at step S115 that the step zoom lens L is currently at the telephoto limit position, the wide-angle zooming process (see FIG. 8) is performed in order to move the step zoom lens L back to the maximum telephoto position, whereby the step zoom lens L is stopped when the "A" code 29e becomes ON (step S117). Thereafter, the current lens position stored in the RAM 10a is determined as the maximum telephoto position.

When it is determined at step S115 that the step zoom lens L is not currently at the telephoto limit position, it is subsequently determined whether or not the step zoom lens L is currently at the maximum telephoto position (step S119). If it is determined at step S119 that the current lens position is not the maximum telephoto position, it is subsequently determined whether or not the telephoto switch 13 is turned ON (step S121). If it is determined at step S121 that the telephoto switch has been turned ON, control is returned to step S93, whereby the movement of the step zoom lens L in the telephoto direction is continued. If it is determined at step S119 that the step zoom lens L is currently at the maximum telephoto position, or if it is determined at step S121 that the telephoto switch is not turned ON, the lens motor 23 is stopped via the motor driver 21 (step S123). At that time, the step zoom lens L is stopped at the position where one of the "A" codes 29b through 29e is ON.

As discussed above, any of the telephoto zooming process in the first through third embodiments can detect the correct position of the step zoom lens L, whereby the drive control of the step zoom lens L can be carried out accurately.

Figure 8:
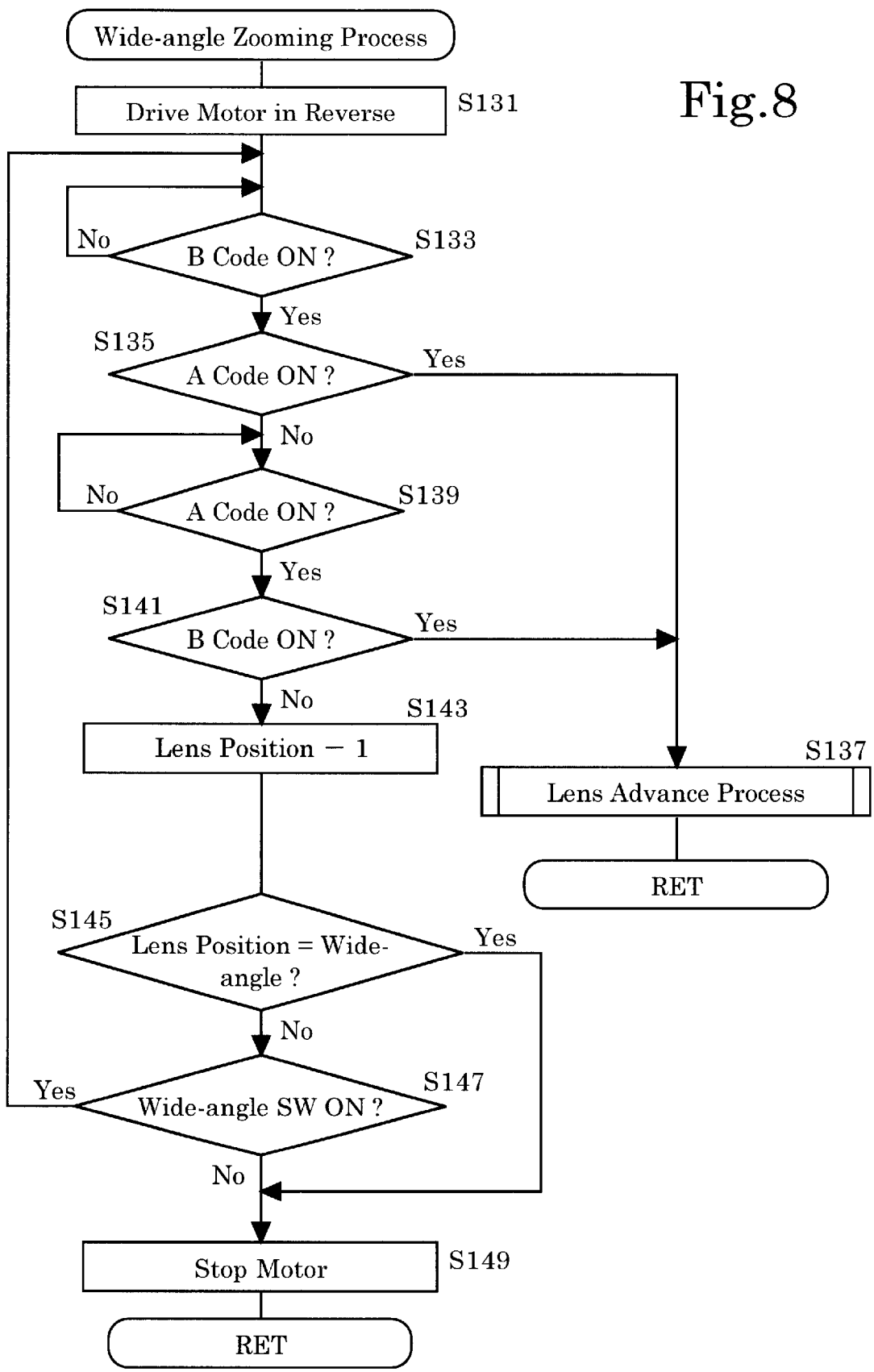
FIG. 8 is a flow chart showing the lens drive control of the lens drive control apparatus shown in FIG. 1 in a wide-angle direction (wide-angle zooming process)

FIG. 8 is a flow chart showing the wide-angle zooming process. The wide-angle zooming process moves the step zoom lens L back in the wide-angle direction, performed while the wide-angle switch 15 is turned ON or when the step zoom lens L goes beyond the maximum telephoto position during the telephoto zooming process.

In the wide-angle zooming process, the lens motor 23 is driven in the reverse direction by the motor driver 21 (step S131), and control waits until the "B" code is ON (step S133). Upon the "B" code becoming ON at step S133, it is determined whether or not the "A" code becomes ON (step S135). If it is determined at step S135 that the "A" code is ON, i.e., when both the "B" code and the "A" code are ON, this means that the step zoom lens L has returned to the retracted position. Consequently, the lens advance process as shown in FIG. 3 is performed at step S137 so that the step zoom lens L can move to the maximum wide-angle position, and the step zoom lens L is stopped at the wide-angle position (the position at which the "A" code 29b is ON).

When it is determined at step S135 that the "A" code is not ON, control waits until the "A" code becomes ON (step S139).

When it is determined at step S139 that the "A" code becomes ON, control proceeds to step S141, and it is determined whether or not the "B" code is ON. If it is determined at step S141 that the "B" code is ON, i.e., when both the "A" code and the "B" code are ON, the lens advance process as shown in FIG. 3 is performed at step S137 so that the step zoom lens L can move to the maximum wide-angle position, and the step zoom lens L is stopped at the wide-angle position (the position at which the "A" code 29b is ON).

When it is determined at step S141 that the "B" code is not ON, the lens position number stored in the RAM 10a is decremented by 1 (step S143). In other words, the lens position stored in the RAM 10a is shifted by one step closer to the maximum wide-angle position. Thereafter, it is determined whether or not the current lens position is the maximum wide-angle position (step S145). If it is determined at step S145 that the current lens position is not the maximum wide-angle position, it is subsequently determined whether or not the wide-angle switch 13 is turned ON (step S147). If it is determined at step S147 that the wide-angle switch has been turned ON, control is returned to step S133, whereby the movement of the step zoom lens L in the wide-angle direction is continued. If it is determined at step S145 that the step zoom lens L is currently at the maximum wide-angle position, or if it is determined at step S147 that the wide-angle switch is not turned ON, the lens motor 23 is stopped via the motor driver 21 (step S149). At that time, the step zoom lens L is stopped at the position where one of the "A" codes 29b through 29e is ON.

When the wide-angle zooming process as discussed above is performed in any embodiment of the telephoto zooming process as shown in FIGS. 5 through 7, the step zoom lens L is drawn back to the maximum telephoto position, and the lens position is set at step S143 as the maximum telephoto position. In this case, it is determined at step S147 that the wide-angle switch is not turned ON, and control proceeds to step S149 in order to stop the lens motor 23.

According to the above description, the position of the step zoom lens L is determined based on the code pattern detected by the zoom encoder 27 and also based on the number of pulses output from the pulse generator 25 during changing of this code pattern. Therefore, the position of the step zoom lens L can be determined by a smaller number of codes, and at the same time, the accuracy of drive control is improved.

In the illustrated embodiment, even in the case that lens position stored in the RAM 10a of the CPU 10 does not coincide with the actual lens position due to an unintentional external force, when the step zoom lens L goes beyond the maximum telephoto position and further moves toward the telephoto limit position, it is still possible to detect that the step zoom lens L has gone beyond the maximum telephoto position according to the number of pulses generated by the pulse generator 25, whereby the drive of the step zoom lens L can be controlled so as not to reach the telephoto limit position.

Although the illustrated embodiment includes the code plate 27a which extends linearly along the direction of movement of the step zoom lens L, it is of course possible to form the code plate in accordance with the type of lens drive mechanism. For example, an arc shaped code plate can be provided around the outer or inner periphery of the cam ring (rotational ring) so that the lens position can be detected according to the rotational angle of the cam ring.

Furthermore, the illustrated embodiment can also be applied to a zoom control of a zoom lens in which the zooming and focusing are controlled by separate operations.

Although the illustrated embodiment is applied to a step zoom lens drive control apparatus for a camera, the illustrated embodiment can be of course applied to various types of optical instruments in which the lens drive control apparatus is incorporated.

As discussed above, according to the present invention, it is possible to provide a lens drive control apparatus which can control the drive of the step zoom lens L accurately without increasing the number of codes.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens drive control apparatus comprising:
   a movable lens which is movable along the optical axis;
   a lens driver which moves said movable lens;
   a code plate having two limit positions respectively serving as mechanical movement limit positions of said movable lens, said code plate comprising first codes corresponding to each of a plurality of predetermined stop positions at which said movable lens is stopped between said two limit positions, and second codes corresponding to each of predetermined positions respectively provided between said limit positions and said plurality of predetermined stop positions;
   a code detector which moves together with said movable lens in order to detect said first and second codes;
   a pulse generator which generates pulses according to the movement of said movable lens;
   a pulse counter which counts the number of pulses generated by said pulse generator; and
   a position determining device which determines an absolute position of said first code detected by said code detector, based on the number of pulses counted by said pulse counter from the time when said code detector detects one of said first code and second code until the time when said code detector detects the subsequent other of said second code and first code, while said lens driver moves said movable lens toward one of said two limit positions.

2. The lens drive control apparatus according to claim 1, wherein each of said first codes and second codes comprises a plurality of detection zones, each detection zone of said plurality of detection zones having a predetermined length with respect to the direction of movement of said movable lens;
   wherein said pulse counter counts the number of pulses based on one of a moment when said code detector detects an extremity of a detection zone of said plurality of detection zones, and a moment when the code detecting state of said code detector changes from one of a detecting state to non-detecting state and a non-detecting state to a detecting state.

3. The lens drive control apparatus according to claim 2, wherein:
said code detector is provided with a first code detector and a second code detector which independently detect said first codes and second codes, respectively.

4. The lens drive control apparatus according to claim 2, wherein said position determining device determines an absolute position of said first code detected by said code detector, based on the number of pulses generated by said pulse generator, from a moment when said code detector detects the change of detecting state of said second code from a non-detecting state to a detecting state until a moment when said code detector detects the change of detecting state of said first code from a non-detecting state to a detecting state.

5. The lens drive control apparatus according to claim 2, wherein one of said two limit positions is provided at a shortest position at which said movable lens can be positioned at a shortest distance from an image plane formed by an imaging optical system including said movable lens, and another of said two limit positions is provided at a longest position at which said movable lens can be positioned at a longest distance from said image plane.

6. The lens drive control apparatus according to claim 5, wherein said imaging optical system comprises a step zoom lens which changes the focal length thereof by moving said movable lens and by stopping said movable lens at each stop position of said plurality of predetermined stop positions.

7. The lens drive control apparatus according to claim 2, wherein one of each distance between each of said first codes and each distance between each of said second codes are not equal to each other.

8. The lens drive control apparatus according to claim 7, wherein said code plate is provided with said second code between the first code corresponding to said longest position and the first code corresponding to the stop position closest to said longest position.

9. The lens drive control apparatus according to claim 8, wherein one of the length in the direction of movement of the movable lens and the number of pulses generated by said pulse generator, with respect to only a detection zone of said second code provided between the first code corresponding to said longest position and the first code corresponding to the stop position closest to said longest position, is different from that of the other detection zones of said second code.

10. The lens drive control apparatus according to claim 6, wherein one of the length in the direction of movement of the movable lens and the number of pulses generated by said pulse generator, with respect to only a detection zone of said second code provided between the first code corresponding to said longest position and the first code corresponding to the stop position closest to said longest position, is respectively one of longer and greater than that of the other detection zones of said second code; and
wherein, while said code detector detects said second codes during movement of said movable lens toward said longest position via said lens driver, said position determining device determines that said movable lens has gone beyond the stop position at said longest position when the number of pulses generated by said pulse generator becomes larger than a predetermined number.

11. The lens drive control apparatus according to claim 5, wherein said movable lens comprises a zoom lens which changes the focal length by zooming from a maximum wide-angle position and subsequently stops at each of said stop positions, wherein the stop position of said zoom lens which is closest to said shortest position is determined as said maximum wide-angle position;
wherein only the length of the second code positioned between the first code corresponding to the stop position closest to said longest position and the first code corresponding to the stop position closest to said longest position is different from the length of the other second codes, with respect to the direction of movement of said movable lens; and
wherein, while said code detector detects said second codes during movement of said zoom lens toward said longest position via said lens driver, said position determining device determines that said zoom lens has gone beyond a maximum telephoto position when the number of pulses generated by said pulse generator becomes larger than a predetermined number.

12. The lens drive control apparatus according to claim 5, wherein, while said lens driver moves said movable lens from said shortest position toward said longest position, said position determining device determines that said movable lens reaches the stop position adjacent to the stop position of said shortest position when said code detector detects the first code subsequent to generation of a predetermined number of pulses by said pulse generator.

13. The lens drive control apparatus according to claim 2, wherein said second code is also provided at the position corresponding to a shortest position of said movable lens closest to a image plane formed by an imaging optical system including said movable lens.

14. The lens drive control apparatus according to claim 2, wherein said movable lens comprises a step zoom lens which can change the focal length thereof by moving said movable lens to any one of said stop positions and performing a focusing operation in a zone between said stop position and the subsequent stop position in the direction of said longest position; and
wherein said second code also serves as a reference position for focusing control by said step zoom lens.

15. The lens drive control apparatus according to claim 2, wherein said first codes and said second codes are arranged in parallel, and wherein said code detector detects said first codes and said second codes.

16. The lens drive control apparatus according to claim 15, wherein said first codes and second codes have repeated patterns of a binary code of ON and OFF.

17. The lens drive control apparatus according to claim 15, wherein said first code is used for detecting the focal length of said step zoom lens, and said second code is used for detecting the position of the focusing position of said step zoom lens.

18. The lens drive control apparatus according to claim 15, wherein said pulse counter is reset when said second code is detected by said code detector, and wherein said pulse counter counts the pulse according to the movement of said step zoom lens between said each stop position, of said plurality of predetermined stop positions, detected by said first code.

19. The lens drive control apparatus according to claim 16, wherein the code detecting state of the code detector is the same, with respect to the first code and the second code, when the movable lens is positioned at the shortest position.

* * * * *